Sept. 3, 1963 F. E. FORSHALL ETAL 3,102,656
COMBINED RECEPTACLE COVER AND SERVER
Filed June 30, 1961
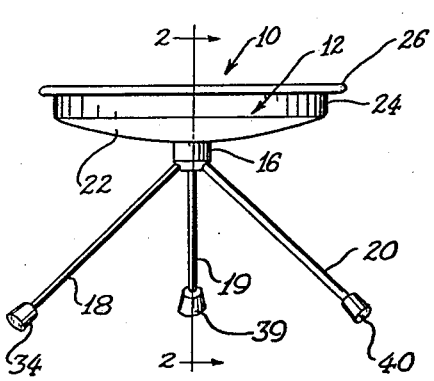
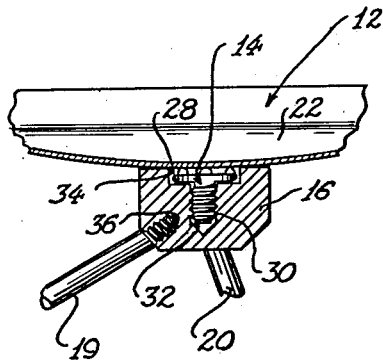
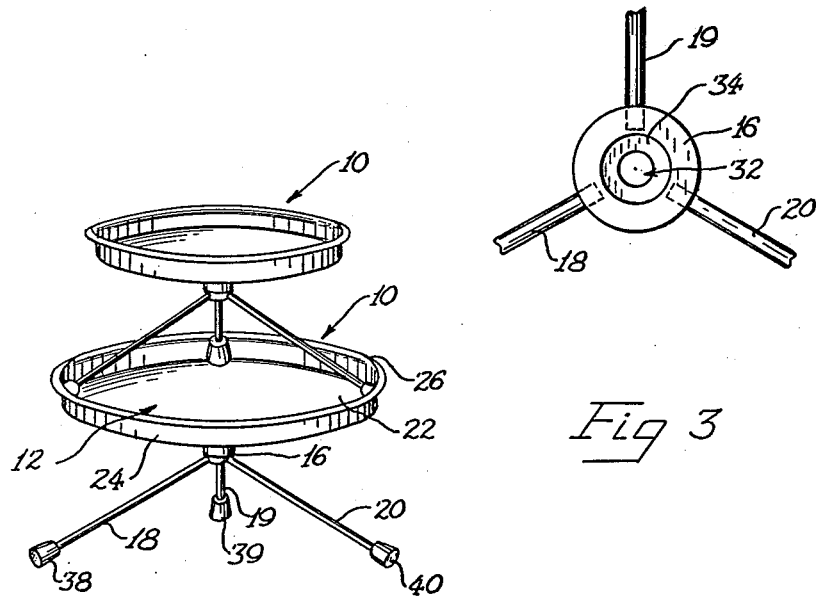
Inventors
Frank E. Forshall
Fred W. Engelmann
BY
Olson, Mecklenburger,
von Holst, Pendleton & Neuman Attys

3,102,656
COMBINED RECEPTACLE COVER AND SERVER
Frank E. Forshall, 6510 Oliphant St., and Fred W. Engelmann, 6207 W. Byron, both of Chicago, Ill.
Filed June 30, 1961, Ser. No. 121,052
4 Claims. (Cl. 220—24)

This invention relates to a cover for a domestic cooking vessel which may be employed alternatively as a server.

Heretofore, the covers or lids for domestic cooking vessels, i.e., pots and pans, have been utilized only during the cooking operation. Since the initial outlay for a set of high quality cookware is in many cases substantial, it is important to achieve full and maximum utilization of all pieces and components. If the housewife can find a substantial use for the covers when the associated pots and pans are not being used, the purchase of the cookware units and sets may be more easily justified. The more varied and versatile the utilization, the greater the justification for purchase.

It is one object of this invention to provide a combined receptacle cover and server which will have many uses in the home.

It is another object of this invention to provide a means for converting a cover for a pot or pan into a very convenient server of pleasing appearance.

Almost all covers or lids for pots and pans of present design employ a centrally disposed knob or handle by means of which the cover may be lifted and manipulated. The heat from surrounding burners or cooking vessels, however, quite often renders such covers difficult to manipulate by means of this small central knob during the cooking operation. If considerable steam has formed in the closed vessel, lifting the cover by the small central knob can result in discomfort due to the heat of the rising steam. Moreover, after the cooking operation, this small central knob does not permit the cover to be conveniently placed in a stable inverted position.

In addition, after the food has been prepared in the covered vessel, it is customary to transfer it from the vessel into a suitable serving dish. Thus, three units are used; and each, of course, requires subsequent cleansing: the receptacle, the cover, and the serving dish.

It is an additional object of this invention to provide a cover having legs or handle elements which diverge upwardly and outwardly from the top thereof to permit easy handling thereof.

Still another object of the invention is to provide a cooking receptacle cover which may be easily and safely manipulated and which may be placed in a stable inverted position wherein it will become a convenient, preheated serving dish, thus eliminating the need for a separate dish for this purpose.

Other objects will be seen, and a fuller understanding of the invention may be had by referring to the following description and claims taken in conjunction with the accompanying drawings.

By means of this invention a cover for a cooking vessel may be conveniently utilized as a serving dish. According to one embodiment of the invention, the combined cover and server comprises a round, substantially dish-shaped body member suitable for covering a cooking vessel and having an outwardly extending, centrally disposed, and externally threaded stud. A round coupling member is provided with a central threaded blind hole and is adapted to be threaded onto the stud of the body member and positioned in substantial abutting relationship with relation to the exterior surface of the body member. This coupling member has a plurality of equally spaced, radial, threaded apertures which are obliquely disposed with respect to the axis of the central blind hole.

A plurality of leg members is also provided. One end of each leg member is externally threaded and is adapted to fit into a respective threaded aperture in the coupling member. The leg members are of substantially equal length, and the free ends thereof lie within a plane and may preferably be circumscribed by a circle of a diameter equal to that of the interior of the body member of a larger sized cover in the set of cookware. This will facilitate the tiering of two or more units, if this is desired.

With reference to the drawings:

FIGURE 1 is a side elevation view of a combined cover and server constructed in accordance with this invention;

FIG. 2 is a sectional view of a portion of the combined cover and server taken substantially along line 2—2 of FIG. 1;

FIG. 3 is a top plan view of the coupling member taken with the dish-shaped body member removed and showing portions of the leg members; and FIG. 4 is a perspective view of the combined cover and server showing the manner in which two such units may be tiered.

The combined cover and server 10 includes a thin, round, substantially dish-shaped metal body member 12 suitable for covering a domestic cooking vessel and having an externally threaded stud 14 (see FIG. 2). Attached to the stud 14 is a coupling member 16, and attached to the coupling member and extending outwardly and downwardly therefrom are three diverging legs 18, 19, and 20.

The body member 12, which may be formed of stainless steel or other suitable material, has a round concave central portion 22, a cylindrical flange portion 24 extending from the periphery of the central portion 22, and a flared lip portion 26 extending radially outward from the extremity of the cylindrical flange portion 24. The body member thus constructed is not only adapted to cover a cooking vessel, i.e., a pot or pan, but when inverted, this member may serve as a separate receptacle for the food.

As best illustrated in FIG. 2, the stud 14 has a flat head portion 28 which is resistance projection welded or otherwise firmly affixed to the center of the concave central portion 22 of the body member. Below the flat head portion 28 is the externally threaded portion 30 of the stud. The coupling member 16 preferably has a round peripheral surface and is provided with a central blind hole 32 which is internally threaded and has a countersunk portion 34. The dimensions of the blind hole 32 and of the countersunk portion 34 are such that the coupling member 16 may be threaded onto the stud 14 until the top of the coupling member comes into engagement with the convex exterior surface of the concave central portion 22 of the cover member 12. When in this position, the countersunk portion 34 of the coupling 16 will accommodate the flat head portion 28 of the stud.

Extending inwardly from the periphery of the coupling member 16 are several threaded radial apertures 36, the axes of which obliquely diverge from the axis of the hole 32 (see FIG. 2). In the preferred embodiment, the angle between the axis of each aperture 36 and the axis of the blind hole 32 is between about 30 degrees and about 45 degrees. There are three such apertures 36 in the illustrated embodiment, and these govern the positioning of the legs 18, 19, and 20.

The legs 18, 19, and 20 each have one end which is externally threaded for insertion into one of the apertures 36, and thus the legs are firmly affixed to the coupling member 16.

The three diverging apertures 36 are spaced equally (approximately 120 degrees) about the axis of the coupling member 16. This results in the legs 18, 19, and 20 also diverging and being equally spaced (120 degrees) about the axis of the coupling member 16. Where more than three legs are employed, the spacing of the legs and of the apertures will, of course, be correspondingly closer. For example, if four legs were provided, these legs and their apertures in the coupling member 16 would be preferably spaced 90 degrees apart. This uniform or even spacing of the legs prevents possible tipping of the unit in service.

The legs 18, 19, and 20 are also of equal length, and the cover member 12 will thus be in a horizontal position when the free ends of the legs 18, 19, and 20 are resting on a horizontal surface, such as a table or counter. The length of the legs is also preferably such that at the particular angle of divergence thereof the free ends of the legs may be circumscribed by a circle approximately equal in diameter to the inside diameter of the body member 12 of one of the larger size covers in the cookware set. As best seen in FIG. 4, this feature permits two units to be tiered. When tiered, the legs of the top unit will rest on the peripheral edges of the concave portion 22 of the lower unit body member and will also preferably engage the cylindrical flange portion 24 of the lower unit body member. The leg members 18, 19, and 20 may be provided with resilient tips 38, 39, and 40, respectively. These tips, which may be constructed of rubber or some similar material, will prevent marring of the surface on which the server is placed and will permit two or more servers to be tiered without damage.

It may be seen that the combined receptacle cover and server constructed in accordance with this invention is a very useful device which will permit an increased utilization of the cookware and will not only facilitate cover manipulation and handling during the cooking operation but will also eliminate the necessity for a separate serving dish after the food has been cooked.

When the cooking operation has been completed, the already heated cover may be inverted and the food placed therein for table service. Purchase of special serving dishes may thus be eliminated. Since the covers are of relatively heavy guage metal, they are very rugged and free from danger of breakage. If desired, the combined cover and server may be employed as a condiment or snack server, and two or more units may be tiered to provide a very decorative, unique, and useful multiple service dish.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. A combined receptacle cover and server comprising, a round, substantially dish-shaped metal body member suitable for covering a cooking vessel and having an outwardly extending, centrally disposed, externally threaded stud with an enlarged head portion, a coupling member in substantial abutting relationship with respect to the exterior surface of said body member and having a blind hole countersunk and internally threaded to accommodate the enlarged head and threaded portions respectively of said stud, said coupling member having a plurality of threaded, equally spaced, radial apertures, equiangularly disposed with respect to each other and with respect to the axis of said blind hole, and a plurality of leg members, each threaded into a respective aperture in said coupling member, the length of said leg members being substantially equal and of such a magnitude that the free ends thereof lie within a plane and may be circumscribed by a circle of a diameter equal to the interior of a larger sized cover, whereby two covers may be tiered.

2. In combination, a substantially dish-shaped cover for covering a cooking vessel, said cover having an outwardly extending, centrally disposed stud, a coupling member removably secured to the stud of said cover and a plurality of elongated easily graspable diverging leg members attached to said coupling member and extending radially outward at a fixed oblique angle with respect to the axis of the stud of said cover, said leg members being of substantially equal length and the free ends thereof defining a plane spaced from said coupling member whereby said leg members may rest on a horizontal surface to support said cover in a horizontal inverted position, and said cover may be used as a server.

3. In combination, a substantially dish-shaped cover for covering a cooking vessel, said cover having an outwardly extending, centrally disposed, externally threaded stud, a coupling member in substantial abutting relationship with respect to the exterior surface of said cover, said coupling member being centrally apertured and internally threaded to accommodate the stud of said cover, said coupling member having a plurality of threaded radial apertures disposed in fixed angular relationship with respect to the axis of said central aperture, and a plurality of elongated leg members, each leg member being threaded into a respective radial aperture in said coupling member, the opposite ends of said leg member lying within and defining a plane spaced from said coupling member whereby said leg members may rest on the horizontal surface to support said body member in a horizontal inverted position and said cover may be used as a server.

4. A combined receptacle cover and server comprising a round, substantially dish-shaped metal cover for covering a cooking vessel, said cover having an outwardly extending, centrally disposed, externally threaded stud, a coupling member in substantial abutting relationship with respect to the exterior surface of said cover, said coupling member being centrally apertured and internally threaded to accommodate the threaded portions of said stud, said coupling member having a plurality of equally spaced radial apertures, equiangularly disposed with respect to each other and with respect to the axis of said central aperture, and a plurality of leg members, each leg member having one end thereof mounted within a respective radial aperture in said coupling member, the length of said leg members being substantially equal and of such a magnitude that the free ends thereof lie within a plane and may be circumscribed by a circle of a diameter equal to the interior of a larger sized cover, whereby two covers may be tiered.

References Cited in the file of this patent

UNITED STATES PATENTS

| | | |
|---|---|---|
| 464,471 | Brown | Dec. 1, 1891 |
| 2,804,989 | Mango | Sept. 3, 1957 |